United States Patent
Wallman

(10) Patent No.: US 7,047,218 B1
(45) Date of Patent: May 16, 2006

(54) METHOD AND APPARATUS FOR TRADING SECURITIES OR OTHER INSTRUMENTS ON BEHALF OF CUSTOMERS

(75) Inventor: Steven M. H. Wallman, Great Falls, VA (US)

(73) Assignee: FOLIOfn, Inc., Vienna, VA (US)

( * ) Notice: Subject to any disclaimer, the term of this patent is extended or adjusted under 35 U.S.C. 154(b) by 0 days.

(21) Appl. No.: 09/516,792

(22) Filed: Mar. 1, 2000

Related U.S. Application Data

(63) Continuation-in-part of application No. 09/038,158, filed on Mar. 11, 1998, now Pat. No. 6,996,539.

(51) Int. Cl.
*G06F 17/60* (2006.01)

(52) U.S. Cl. .......................... 705/36 R; 705/35; 705/37
(58) Field of Classification Search .................. 705/37, 705/40, 35, 36
See application file for complete search history.

(56) References Cited

U.S. PATENT DOCUMENTS

| | | | |
|---|---|---|---|
| 4,346,442 A | 8/1982 | Musmanno | 364/408 |
| 4,376,978 A | 3/1983 | Musmanno | 364/408 |
| 4,566,066 A | 1/1986 | Towers | 364/408 |
| 4,597,046 A | 6/1986 | Musmanno et al. | 364/408 |
| 4,642,768 A | 2/1987 | Roberts | 364/408 |
| 4,648,038 A | 3/1987 | Roberts et al. | 364/408 |
| 4,674,044 A | 6/1987 | Kalmus et al. | 364/408 |
| 4,750,121 A | 6/1988 | Halley et al. | 364/408 |
| 4,751,640 A | 6/1988 | Lucas et al. | 364/408 |
| 4,774,663 A | 9/1988 | Musmanno et al. | 364/408 |
| 4,910,676 A | 3/1990 | Alldredge | 364/408 |
| 4,933,842 A | 6/1990 | Durbin et al. | 364/408 |
| 4,953,085 A | 8/1990 | Atkins | 364/408 |
| 4,980,826 A | 12/1990 | Wagner | 364/408 |
| 4,989,141 A | 1/1991 | Lyons et al. | 364/408 |
| 4,994,964 A | 2/1991 | Wolfberg et al. | 364/408 |
| 5,038,284 A | 8/1991 | Kramer | 364/408 |
| 5,101,353 A | 3/1992 | Lupien et al. | 364/408 |
| 5,126,936 A | 6/1992 | Champion et al. | 364/408 |
| 5,132,899 A | 7/1992 | Fox | 364/408 |
| 5,148,365 A | 9/1992 | Dembo | 364/402 |
| 5,193,056 A | 3/1993 | Boes | 364/408 |
| 5,202,827 A | 4/1993 | Sober | 364/408 |

(Continued)

FOREIGN PATENT DOCUMENTS

WO    WO 95/26005    *    9/1995

(Continued)

OTHER PUBLICATIONS

Ziegler, A. Optimal Portfolio Choice under Heterogenous Beliefs, Jan. 19, 2000. European Finance Review, Kluwer Academic Publishers, pp. 1-19.*

(Continued)

*Primary Examiner*—Hani M. Kazimi
*Assistant Examiner*—Stefano Karmis
(74) *Attorney, Agent, or Firm*—Kenyon & Kenyon LLP

(57) ABSTRACT

A method and apparatus for aggregating, netting, and executing securities trades on behalf of customers expressing orders in both share and dollar amounts without assuming unwanted risk. Where a brokerage receives orders from customers in both dollar and share amounts, the brokerage can aggregate and net the orders, executing the outstanding orders through a market maker. The number of shares to order through the market maker depends on the price at which the market maker can execute. Rather than present the market maker with a conventional order, the brokerage presents the market maker with a schedule of orders for different possible execution prices.

6 Claims, 3 Drawing Sheets

U.S. PATENT DOCUMENTS

| | | | |
|---|---|---|---|
| 5,210,687 A | 5/1993 | Wolfberg et al. | 364/408 |
| 5,214,579 A | 5/1993 | Wolfberg et al. | 364/408 |
| 5,220,500 A | 6/1993 | Baird et al. | 364/408 |
| 5,227,967 A | 7/1993 | Bailey | 364/408 |
| 5,262,942 A | 11/1993 | Earle | 364/408 |
| 5,270,922 A | 12/1993 | Higgins | 364/408 |
| 5,297,032 A | 3/1994 | Trojan et al. | 364/408 |
| 5,375,055 A | 12/1994 | Togher et al. | 364/408 |
| 5,497,317 A | 3/1996 | Hawkins et al. | 364/408 |
| 5,517,406 A | 5/1996 | Harris et al. | 364/408 |
| 5,649,116 A | 7/1997 | McCoy et al. | 395/238 |
| 5,664,115 A | 9/1997 | Fraser | 705/37 |
| 5,671,363 A | 9/1997 | Cristofich et al. | 395/237 |
| 5,689,650 A | 11/1997 | McClelland et al. | 395/236 |
| 5,704,045 A | 12/1997 | King et al. | 395/235 |
| 5,710,889 A | 1/1998 | Clark et al. | 395/244 |
| 5,724,524 A | 3/1998 | Hunt et al. | 395/237 |
| 5,729,700 A | 3/1998 | Melnikoff | 395/236 |
| 5,745,706 A | 4/1998 | Wolfberg et al. | 395/235 |
| 5,749,077 A | 5/1998 | Campbell | 705/36 |
| 5,758,097 A | 5/1998 | Debe et al. | 395/235 |
| 5,761,441 A | 6/1998 | Bennett | 395/235 |
| 5,761,442 A | 6/1998 | Barr et al. | 395/236 |
| 5,765,141 A | 6/1998 | Spector | 705/14 |
| 5,774,881 A | 6/1998 | Friend et al. | 705/36 |
| 5,784,696 A | 7/1998 | Melnikoff | 705/36 |
| 5,794,219 A | 8/1998 | Brown | 705/37 |
| 5,799,287 A | 8/1998 | Dembo | 705/36 |
| 5,806,047 A | 9/1998 | Hackel et al. | 705/36 |
| 5,806,049 A | 9/1998 | Petruzzi | 705/36 |
| 5,812,987 A | 9/1998 | Luskin et al. | 705/36 |
| 5,918,218 A | 6/1999 | Harris et al. | 705/37 |
| 5,930,774 A | 7/1999 | Chennault | 705/36 |
| 5,946,666 A | 8/1999 | Nevo et al. | 705/36 |
| 5,963,923 A * | 10/1999 | Garber | 705/37 |
| 5,978,778 A | 11/1999 | O'Shaughnessy | 705/36 |
| 6,247,000 B1 * | 6/2001 | Hawkins | 705/37 |
| 6,324,525 B1 * | 11/2001 | Kramer | 705/40 |
| 6,615,188 B1 * | 9/2003 | Breen et al. | 705/37 |

FOREIGN PATENT DOCUMENTS

| | | |
|---|---|---|
| WO | WO 98/44443 | 10/1998 |
| WO | WO 98/44444 | 10/1998 |
| WO | WO 99/28845 | 6/1999 |

OTHER PUBLICATIONS

Robert Barker, A Capital-Gains Miracle Worker, Business Week, Jan. 31, 2000, p. 130.

Anne Tergesen, Here Come the E-Funds, Business Week, Jan. 31, 2000, p. 125.

1998 ADP Investor Communications Services, ProxyEdge™ 2000.

* cited by examiner

METHOD AND APPARATUS FOR TRADING SECURITIES OR OTHER INSTRUMENTS ON BEHALF OF CUSTOMERS

This application is a continuation-in-part Ser. No. 09/038,158 filed on Mar. 11, 1998 now U.S. Pat. No. 6,996,539.

BACKGROUND OF THE INVENTION

The present invention relates generally to methods and apparatuses for trading securities or other instruments, and more particularly to a method and apparatus for trading securities or other instruments on behalf of investors, in which the trades are aggregated and netted against each other prior to executing the remaining trades.

The present invention is related to U.S. patent application Ser. No. 09/038,158 and to U.S. patent application Ser. No. 09/139,020, which is a continuation-in-part of U.S. patent application Ser. No. 09/038,158. Both applications disclose a portfolio manager for creating and managing portfolios of securities, in which, among other things, trades are aggregated and netted prior to executing certain types of securities trades. Both U.S. patent application Ser. Nos. 09/038,158 and 09/139,020 are hereby incorporated by reference, as if repeated herein in their entirety, including the drawings.

Traditional full-service and online brokerages accept orders to purchase a particular number of shares of a security. The brokerages then execute those orders through a market maker in that security. These orders may take one of a variety of forms. The basic forms include: (a) market orders, in which the customer orders the brokerage to buy or sell a specified number of shares at the best price currently available in the market; and (b) limit orders, in which the customer orders the brokerage to buy or sell a specified number of shares at or better than a specified price. The orders are then relayed to market makers for execution in essentially the same form that they are presented to the brokerages by the customers. That is, the brokerages frequently do little more than pass the order on to the market maker for execution.

There are several limitations to this traditional method of executing orders to trade securities. First, they are relatively inefficient from a transaction cost perspective. There are economies of scale to be gained by aggregating and/or netting the orders and presenting the market maker with one large order per stock, rather than hundreds or even thousands of small orders per stock.

Second, this method does not always secure the best execution for customers. For example, assume the bid-ask spread on a stock X is $1. If customer one, $C_1$, wants to buy that stock from a brokerage using the traditional method, $C_1$ will pay $P_a$ (the ask price). If the brokerage has another customer, $C_2$, who wants to sell the same stock at the same time, $C_2$ will pay $P_b$ (the bid price)=$P_a$−$1. If the brokerage were to aggregate and net the orders, however, it could execute the trade at a superior price from the perspective of both $C_1$ and $C_2$ by selling $C_2$'s stock to $C_1$ at the mid-point price, $P_m=(P_a+P_b)/2$. This yields the buying customer a lower price and the selling customer a higher price than either would get under the traditional method.

Third, the traditional method requires investors to trade in share amounts, rather than dollar amounts. Normally, an investor places a market order by specifying a number of shares that the investor wishes to buy or sell and entrusting the brokerage to obtain the best execution within a short time-frame. The investor using a market order can approximate the dollar amount involved in the transaction only by multiplying the number of shares specified by the price at which the investor believes the trade will be executed. Typically, however, the investor has only a rough idea of what the execution price will be. The investor has a somewhat better idea of what the maximum or minimum dollar amount of a purchase or sale will be if the investor places a limited order. Even under a limited order, however, the investor will not know the dollar amount of the trade until the trade is executed.

Some of these problems can be solved through a method and apparatus that allows investors to express orders in either share or value-base terms and then aggregates and nets those orders. U.S. patent application Ser. No. 09/516,787 filed concurrently herewith by the same inventor discloses a method and apparatus for enabling investors to express and submit trading orders in the form of share-base and dollar-based (or value-base) orders, which application is hereby incorporated by reference as if repeated herein in its entirety, including the drawings.

Receiving trading orders at the brokerage in dollar-based or share-based orders presents new challenges, however. If some customers express orders in share amounts and some customers express orders in dollar amounts, there is currently no way to execute the order that provides customers with the same price regardless whether they express their order in terms of shares or dollars without the brokerage assuming a sizable amount of risk.

Assume, for example, that the brokerage receives orders aggregating and netting to the following:

buy 1000 shares of X at $P_{mkt}$ (market price) and $100 dollars worth of shares in X at $P_{mkt}$.

If the price of X were $10 per share, the brokerage would send an order to buy 1100 shares. If the price of X were to move from $10 to $11 between when the brokerage sent the order and when the market maker executed the order, this order would result in the brokerage owning too much stock. The brokerage would use 1000 shares to cover the share-based orders. The brokerage would then use the next 90.91 shares to cover the dollar-based orders. The brokerage would be left owning 9.091 shares for which it had no customer orders. This would expose the brokerage to risk that it might not wish to accept. Multiplied by thousands of orders and, potentially, thousands of shares, this risk adds up and could put millions of dollars of the brokerage's assets at risk.

Accordingly, there is a need in the art for a method and apparatus for removing inefficiencies in the trading of securities or other tradable instruments representing underlying assets and liabilities, while adding more certainty to the trader as to the amount of the transaction prior to execution or even submission to the brokerage.

SUMMARY OF THE INVENTION

Embodiments of the present invention provide a method for executing trades in at least one instrument. The method can include combining a value-based trading order for at least one instrument with a share-based trading order for the at least one instrument to create a final trading order for the at least one instrument. The method can also include converting the final trading order into a series of contingent orders for the at least one instrument specifying a number of shares of the at least one instrument to be traded at a schedule of prices.

DETAILED DESCRIPTION

Although the embodiments of the present invention are described herein in terms of orders to buy shares of stock, the present invention is equally applicable to orders to buy any instrument representing an underlying tradable asset or liability, including, but not limited to government bonds, Treasury-bills, shares in mutual funds, shares in investment trusts, derivatives, investment contracts, bearer bonds, mutual funds, bank notes, insurance contracts, letters of credit, etc. Furthermore, although the embodiments of the present invention are described in terms of dollars, the present invention is equally applicable to transactions in any currency or denomination or other variable that is deterministically convertible to a number of shares. In fact, one aspect of the present invention provides certain advantages for processing of orders received in multiple currencies.

Overview

Figure 1:
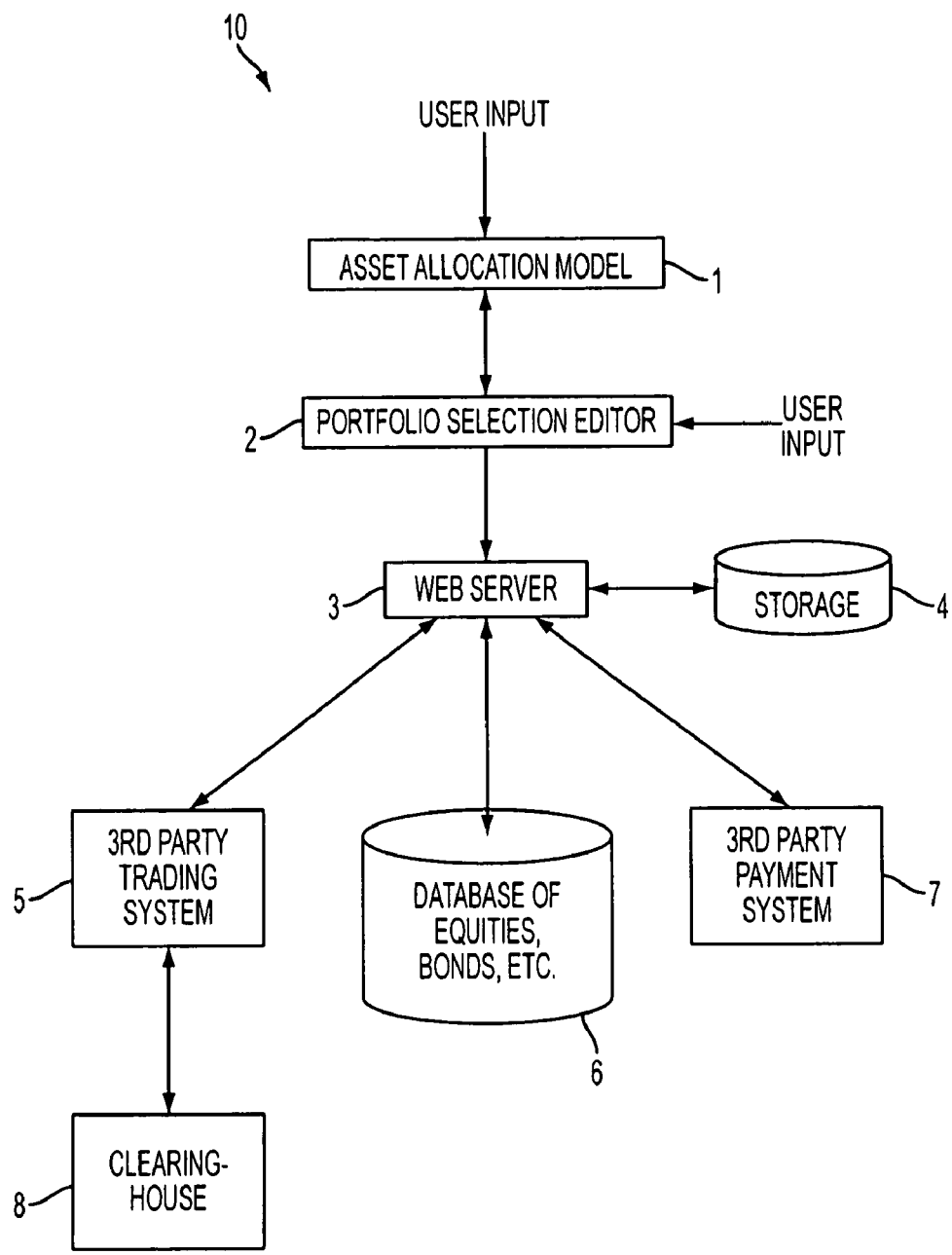
FIG. 1 depicts an exemplary embodiment of a system according to the present invention.

Referring to FIG. 1, shown therein is an exemplary embodiment of a system 10 for creating a portfolio of securities or investments by small or individual users. Larger investors can use the same system, however, its cost efficiencies make possible for the first time diverse portfolios for small periodic investments of money. According to this exemplary embodiment, a user provides input to an asset allocation model 1, which helps create the user's portfolio of investments. The asset allocation model 1 interacts with a portfolio selection editor in the creation of the user's investment portfolio. A web server 3 is coupled to storage 4 and database 5 storing information on equities, bonds and other investments. The web server is also coupled to the user via a computer network such as the Internet. The web server 3 interacts with a third party trading system 5 and a clearinghouse 8 to implement the user's investment portfolio. The web server also employs a third party payment system 7 to obtain payment from the user for the desired investments.

Figure 2:
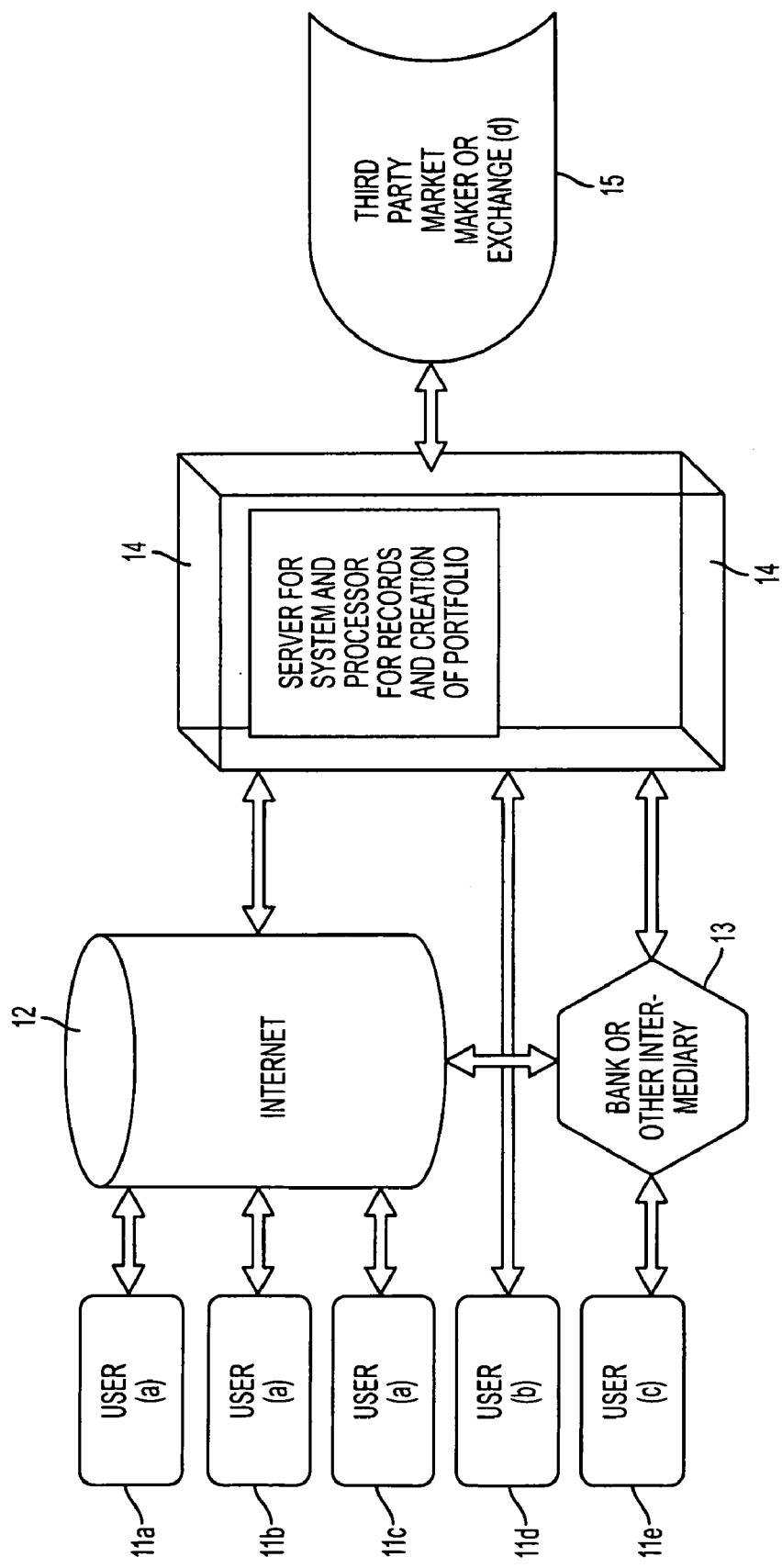
FIG. 2 depicts an exemplary embodiment of another system according to the present invention.

Referring to FIG. 2, shown therein are multiple customers 11a–11e. Each of these customers operates a portfolio management program on his or her personal computer. The portfolio manager enables the customer to create a portfolio of securities with small, periodic investments without the usual inefficient transaction costs normally associated with each transaction. The transactions created by each of the customers 11a are transmitted via the Internet 12, for example, to a central controller or server 14. Customer 11d is coupled to the server 14 directly via telephone modem or local area network connection, for example. Customer 11e is coupled to the server 14 via an intermediary 13, such as a bank. The server 14 is in turn connected to a third party market maker or exchange 15.

The central controller 14 performs aggregation and netting of each of the customers orders so that only one trade to the market maker in each security must be made each transaction cycle, which may occur several times a day. This reduces the costs for each of the customers, thereby enabling creation of a diverse investment portfolio for small amounts of money without the otherwise prohibitive costs that are normally incurred on a per transaction basis. Further details of such a system are disclosed in U.S. patent application Ser. Nos. 09/038,158 and 09/139,020, which disclose a portfolio manager for creating and managing portfolios of securities, in which, among other things, trades are aggregated and netted prior to executing certain types of securities trades, both of which applications have been previously incorporated.

Figure 3:
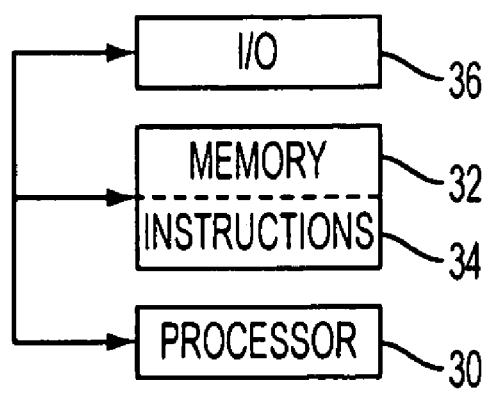
FIG. 3 is a block diagram of a processor that can be embodied in a system of the present invention.

FIG. 3 is a block diagram of an illustrative processor 30, which can be included in controller and/or server 14. Processor 30 can be coupled, either directly or indirectly, to a memory 32 containing instructions 34 that when executed cause processor 30 to perform the various functions of controller and/or server 14. Processor 30 can also be coupled to one or more well-known input/output (I/O) devices 36.

Input/output (I/O) device 36 can be an audio and/or visual device, including, for example, a monitor, display, keyboard, keypad, touch pad, pointing device, microphone, speaker, video camera, camera, scanner, printer, and/or port to which an I/O device can be attached or connected.

In one embodiment, processor 30 can be a general-purpose microprocessor, such as the Pentium series microprocessor manufactured by the Intel Corporation of Santa Clara, Calif. In another embodiment, the processor can be an Application Specific Integrated Circuit (ASIC), which has been designed to implement in its hardware and/or firmware at least a part of a method in accordance with an embodiment of the present invention.

Memory 32 can be any device capable of storing analog or digital information, such as a hard disk, Random Access Memory (RAM), Read Only Memory (ROM), flash memory, a compact disk, a magnetic tape, a floppy disk, and any combination thereof.

Acceptance and Processing of Mixed Orders

According to one exemplary embodiment of the present invention, a system of the present invention operating under control of a brokerage or other financial institution, for example, accepts trading orders whose "quantity" field is specified in terms of how many shares of a particular security are being traded or by how much in value of the particular security being traded is desired to be traded, in accordance with each investor's individual preference. Moreover, the same investors may even transmit orders simultaneously including share-based and value-based trades, thereby requiring the recipient, e.g., the system of the brokerage or financial institution, to accept in a single order trades expressed as value-based and trades expressed as share-based.

An example of a value-based trade includes specifying how many dollars worth of a particular security is to be traded. One can also specify the order in any currency, for example.

Value-based refers to any currency-based or other basis for expressing the size of the order. A value-based trading order does not specify the trade in terms of Y shares of security X to be bought or sold, but rather Y value worth of security X to be bought or sold. In this case, the value could be anything having a known or knowable value, including dollars, yen, euros, any foreign currency, commodities, securities, etc. Thus, the trade could be specified in terms of a commodity, e.g., barrels of oil, ounces of gold, etc., which is readily convertible to any standard currency. Moreover, one might specify a trade in terms of a security in which the trader wishes to sell, such as:

Buy "213 shares of security X worth" of security Y.

The portion of the above trading order in quotes (" ") represents the quantity or size specification of this particular order. In this example, the trader wishes to buy 213 shares worth of security Y but also wishes to sell 213 shares of security X. Rather than converting to dollars in the specification of how much is to be traded, or estimating both the purchase price of security Y and the selling price of security X, both of which are difficult to know in advance, the trader simply identifies to the brokerage the resources with which the trader will use to purchase security Y in a single concise statement.

Value-based orders are particularly convenient when the amount of the trade is small relative to a price of the security. When implementing a diverse portfolio of investments for a small investor making small monetary investments, but on a periodic basis, it is more intuitive to the small investor to request a trade in terms of value (e.g., dollars) rather than in a number of fractional shares to be purchased (e.g., 0.01356 shares). Moreover, the actual numbers of shares being purchased is usually not particularly relevant to such an investor, but rather the relevant issue is how much the investor is trading or investing. Particularly for novice investors, specifying trades in terms of value is more intuitive than shares, the precise value of which is often difficult to determine for novice investors as it depends on the number of outstanding shares which fluctuate and the value of the issuer, which even sophisticated investors have difficulty determining.

Therefore, the present invention enables investors or customers to specify a trading order in terms that make more sense to the customer. However, given the large base of investors already comfortable with share-based orders, the present invention provides the capability of accepting different types of trading orders—e.g., value-based and share-based.

For example, investors may transmit orders to the system under control of the brokerage or financial institution (e.g., a server housed in the brokerage or financial institution) in the form of either constant dollars and market price ($P_{mkt}$) or constant shares and market price ($P_{mkt}$). In the former, the market price ($P_{mkt}$) will determine the quantity of shares, whereas in the latter, the market price will determine the dollar amount of the trade. Thus, the brokerage will receive and must then process orders received in terms of shares, dollars and other currencies or denominations.

The following is an example of two trading orders transmitted to a brokerage according to this aspect of the present invention.

Buy 1000 shares of security X at $P_{mkt}$ (market price) and

Buy $100 dollars worth of shares in X at $P_{mkt}$.

The former is a share-based trading order because the quantity of the trading order is specified in terms of a number of shares. The latter is a value-based trading order because the quantity of the trading order is specified in terms of its value, which in this case is further specified in terms of dollars. Thus the latter can be considered a value-based trading order, a currency-based trading order and a dollar-based trading order.

Similarly, one example of trading orders on the sell side includes the following:

Sell 1000 shares of security X at $P_{mkt}$ (market price) and

Sell $100 dollars worth of shares in X at $P_{mkt}$.

As in the above, the former sell order is a share-based trading order because the quantity of the trading order is specified in terms of a number of shares. The latter is a value-based trading order because the quantity of the trading order is specified in terms of its value, which in this case is further specified in terms of dollars. The latter can be considered a value-based trading order, a currency-based trading order and a dollar-based trading order.

It is worthy to note that it may not be possible to implement the value-based sell order at the specified value if the user does not have sufficient shares of security X to sell at the current market price. In this case, the brokerage may either return the value-based sell order or execute the order by selling all of the shares currently owned by the customer at the then prevailing price. In the second case, the brokerage may notify the customer in advance of this possibility for order reconfirmation when the number of shares currently held by the customer is within a predetermined percentage, such as 10% for example, such that an unfavorable price movement in this security would potentially result in the inability to sell the security at the value specified.

In addition, investors may transmit trades to a brokerage as specified in foreign currency, which certain investors may wish to do so, such as investors with proceeds from a foreign investment or transaction, for example. The following is an example of a trading order specified in a foreign currency.

Sell 100 euro worth of shares in X at $P_{mkt}$.

The above order can be considered both a value-based order and a currency-based order, but not a dollar-based order.

As mentioned above, customers may specify a trade in terms of something of value, such as gold bullion. An example of this type of trading order is the following.

Sell 1000 barrels of oil worth of shares in X at $P_{mkt}$.

Buy 10,000 pounds of gold bullion worth of shares in X

Both of the above exemplary trading orders may be considered value-based trading orders, but not currency-based or dollar-based trading orders. The latter trading order may be particularly useful if the customer is attempting to both sell gold bullion and buy shares in X.

Yet another exemplary embodiment of an order in which the so-called "quantity" portion of the order is defined in different terms includes specifying the amount of risk the new order will add to one's portfolio. For example, an investor may wish to buy a certain amount of a highly risky stock to move the risk of his portfolio (quantified in terms of "beta") up 0.1 points, or conversely buy a relatively conservative stock to decrease the beta of the portfolio. However, the investor may not know how many shares or even how much value of the particular security he must purchase. In this case, the portfolio manager or brokerage, for example, will calculate the amount of stock based on the holdings currently in the investor's portfolio.

In this embodiment, an order of this type might look something like:

Buy 0.1 Beta worth of security X (tag line with order to include total current beta and total value of portfolio).

In addition, the investor may wish to specify multiple securities to change his beta. For example, suppose the investor wishes to purchase utility stocks to reduce the risk inherent in his portfolio. In this case, the trader might wish to specify three such utility stocks. So, an exemplary order might look like:

Buy 0.1 Beta worth of securities X, Y and Z (tag line with order to include total current beta and total value of portfolio) In this case, the portfolio manager would spread the risk evenly across these three securities in either even dollar amounts, or even share amount, or in weights based on the various stocks capitalization or other indicia of market value.

Other standard variants of trading orders via which investors may express trading desires are also possible using both dollar-based and share-based specifications, including but not limited to limit orders whose limits are specified in dollars or shares from a dollar value or share amount, respectively, contingent trades whose contingencies are specified in terms of dollars or shares, etc.

All of the above exemplary embodiments of trading orders, including value-based, currency-based, dollar-based and share-based can be implemented, for example, using the well-known Financial Information Exchange (FIX). Existing fields may be provided in which the sender can specify a security, a quantity and a price. In accordance with the FIX protocol, user defined fields can be added to specify other aspects. User-defined fields can be added to this FIX specification to provide fields to specify the denomination in the case of currency-based trading order and to specify the value basis for value-based trading orders. Once in the FIX protocol, these orders can be transmitted to FIX-compliant computers, which are ubiquitous throughout the financial industry.

Aggregation/Netting Mixed Orders

Another aspect of the present invention combines all value-based orders and all share-based orders into a single order to buy or sell a value-based amount and/or a single order to buy or sell a share-based amount of each security being traded. If different value bases are used, there may be one order for each value basis, or it may be then combined with the other value bases to form a single value-based order. Various possible techniques for performing this combining are possible.

One possible embodiment of combining trading orders includes aggregating and netting the orders, or simply netting orders against each other as they arrive, for example.

Once the orders are combined into a single value-based order and a single share-based order, they are converted into a single order. One possible embodiment for converting the resulting value-based order and the resulting share-based order into a large final order includes transforming the value into a base currency in which the securities or instruments are being traded.

As used herein, the term "aggregating" can include collecting orders having a similar characteristic, and/or summing such orders. The term "netting" can include comparing aggregated buy orders and sell orders, and ignoring, for the sake of a final order, those buy orders that are balanced by sell orders. The term "converting" can include transforming a value-based order into a share-based order or vice versa, and transforming a value in one currency to a value in another currency. The term "combining" can include aggregating, netting, and converting.

Potentially, all dollar-based orders could net each other out exactly, leaving only a single share-based order, or all share-based orders could net each other out exactly leaving only a single dollar-based order. Moreover, while remotely possible, all share-based orders could net each other out exactly and all dollar-based orders could net each other out exactly leaving nothing to buy or sell. These are special cases of the more general case, however, which we shall consider further.

In the case of orders received in multiple currencies, the system can aggregate and net first all currency-based trading orders in a similar currency, thereby avoiding multiple foreign exchange rate conversions and the inefficiencies associated with such conversions, prior to aggregating and netting the resulting trading order against other value-based (or currency-based) trading orders denominated in different currencies. Each of the trading orders resulting from the aggregation and netting process in a particular currency can be converted to a standard currency, such as the dollar, yen or euro, for example. Once converted to the standard currency, all converted currency-based trading orders can be aggregated and netted against each other to form a single standard-currency-based trading order (either a buy or a sell in each security).

In this foreign currency aggregation and netting, there are two costs savings. First, the cost of conversions is saved for any netted transactions, in that these transactions require no conversions and therefore required no costs. Second, the resulting single conversion will usually be larger than any individual conversion, which can be done at a better rate than a smaller conversion. Both of these cost savings are then passed on to all foreign currency based orders.

In the case of value-based orders, the system can aggregate and net all trading orders using the same value basis before aggregating and netting them against other currency-based trading orders.

An exemplary embodiment of the aggregation and netting of mixed dollar-based and share-based orders operates as follows. First, a system of the present invention combines all share-based orders for a particular security X into a single share-based order for security X; and combines all dollar-base orders for security X into a single dollar-based order for security X, thereby resulting in two single orders, one based in dollars and the other based in shares.

The resulting two-part order from the above process includes: (1) an order to either buy or sell a particular quantity (ranging from zero to any positive number, which is only limited by the number of shares being traded) of shares in X; and (2) an order to either buy or sell a particular dollar amount (ranging from zero to any positive dollar amount, which is only limited by the amount of dollars being traded) of shares in X. In sum, this step results in an aggregated and netted dollar-based order and an aggregated and netted share-based order.

Apparatus for Determining Schedule of Orders and Performing Aggregation and Netting of Mixed Orders One possible implementation of an apparatus for combining mixed trading orders by, e.g., aggregating and/or netting, includes a central processor coupled to a computer network, such as the Internet, that receives customer orders electronically, aggregates and nets the orders, calculates the schedule of orders and transmits the schedule to the market maker over a computer network, such as the Internet. In this exemplary embodiment, customers execute a portfolio manager program on their personal computers and are linked to the central processor via direct dial-up modem, local area network connection or other computer network, such as the Internet.

Schedule of Contingent Orders—Fixed Price Implementation

To ensure that the brokerage does not purchase an excess number of shares as a result of a change in price between the time the investors submit their orders and the time the orders are executed, an exemplary embodiment of the present invention provides the market maker with a series or schedule of contingent orders rather than presenting the market maker with a traditional, unconditional order to buy Y shares of X security at the best price. The series of contingent orders instructs the market maker to purchase a predetermined number of shares as a function of the available price. Thus, this series of contingent orders is essentially a matrix of orders, only one of which is executed by the market maker.

The system under control of the brokerage or other financial institution converts the single, two-part order resulting from the aggregation and netting process into a series of one-part orders specifying a number of shares to be bought or sold at a schedule of prices. For any particular price in the schedule, the number of shares to be bought or sold is determined, for example, by the following equation:

$$S^* = (N_s^b - N_s^s) + (N_S^b - N_S^b)/P \qquad \text{Equation (1)}$$

Where $S^*$=the number of shares ordered to be bought or, if negative, sold by the brokerage through the market maker at a particular P;

$N_s^b$=buy orders expressed in shares by customers of the brokerage;

$N_s^s$=sell orders expressed in shares by customers of the brokerage;

$N_S^b$=buy orders expressed in dollars by customers of the brokerage;

$N_S^s$=sell orders expressed in dollars by customers of the brokerage;

P=price of the security in question, where P is permitted to vary over a specified range.

The first part $(N_s^b - N_s^s)$ of Equation (1) represents the number of shares resulting from the combination (e.g., aggregation and netting) of share-based orders, which is simply the difference between the number of shares being requested in all buy orders and the number of shares being requested in all sell orders in each security. For example, if all received share-based orders for security X when aggregated total 10,000 shares to be purchased and 11,000 shares to be sold, this part $(N_s^b - N_s^s)$ equals −1000 shares, the negative sign indicating that the net result is a sell order for 1000 shares of security X.

As used herein, the term "aggregating" can include collecting orders having a similar characteristic, and/or summing such orders. The term "netting" can include comparing aggregated buy orders and sell orders, and ignoring, for the sake of a final order, those buy orders that are balanced by sell orders. The term "converting" can include transforming a value-based order into a share-based order or vice versa, and transforming a value in one currency to a value in another currency. The term "combining" can include aggregating, netting, and converting.

The second part $(N_S^b - N_S^s)/P$ has two components. The first component $(N_S^b - N_S^s)$ represents the result of the combination (e.g., aggregation and netting) of all dollar-based orders for a given security, which is simply the difference in dollars between the amount of stock being requested in all buy orders but denominated in dollars and the amount of stock being sold in all sell orders but denominated in dollars. For example, if all received dollar-based orders for security X when aggregated total $20,000 worth of security X to be purchased and $25,000 worth of security X to be sold, the first component $(N_S^b - N_S^s)$ equals −$5000 worth of security X, the negative sign indicating that the net result is a sell order for $5000 worth of security X.

The second component of the second part P represents the price of the security in question at the time of the trade. Often, this value is not known prior to the trade. Consequently, the number of shares being purchased is a function of the unknown purchase price.

As the purchase price can be bounded based on trading information available to the brokerage at the time the trades are received from the investors, the brokerage can provide a list of possible prices in 1/16 increments around the latest trading price. If the list encompasses, for example, a possible 5% upswing and a possible 5% downswing, almost all possible prices will be covered in the list. Other ranges about the latest trading range can be used, depending upon the normal volatility of a given stock, and may in fact be adjusted to compensate for market volatility as well.

For each price in this list of prices, a number of shares can be calculated that will result in reducing the potential exposure to the brokerage that would otherwise result in the brokerage buying too many shares. This calculated number will limit the number of excess shares to one.

Any resulting fractional shares can be rounded up to the nearest share. Thus, if the equation produces an order to by 103.001 shares, the order is rounded up to an order to buy 104 shares. Under this method, the risk to the brokerage is limited to the risk that the brokerage is required to assume because of this rounding. Therefore, at most the brokerage will assume the risk of a single share of every security in which it has traded, which is relatively insignificant.

For example, assume the system receives orders to buy 2000 shares of X at the market price (share-based orders); orders to buy $2000 dollars worth of shares in X at the market price (dollar-based orders); orders to sell 1000 shares of X at the market price (share-based orders); and orders to sell $1000 dollars worth of shares in X at the market price (dollar-based orders). The exemplary embodiment first yields a two-part aggregated and netted order to buy 1000 shares of security X plus $1000 dollars worth of shares of security X.

The exemplary embodiment next yields a series of one-part orders presented for different variations of P as follows:

. . .

if P=9.6875 then buy 1104 shares of X;
if P=9.75 then buy 1103 shares of X;
if P=9.8125 then buy 1102 shares of X;
if P=9.875 then buy 1102 shares of X;
if P=9.9375 then buy 1101 shares of X;
if P=10 then buy 1100 shares of X;
if P=10.0625 then buy 1100 shares of X;
if P=10.125 then buy 1099 shares of X;
if P=10.1875 then buy 1099 shares of X;
if P=10.25 then buy 1098 shares of X;
if P=10.3125 then buy 1097 shares of X;

. . .

The end result is that only one trade in the schedule of contingent trades occurs, depending upon the price at the time of execution. For example, if the price of security X is 10.3125, then the market maker purchases 1097 shares of security X on behalf of the brokerage that transmitted the schedule of orders. Alternatively, if the price of security X is 10.000, then the market maker purchases 1100 shares of security X. In all cases, at most only one extra share is purchased of each security in which the brokerage trades that day. Obviously, any succeeding trades can be used to attempt to trade the extra share.

Equitable Allocation Method

According to another exemplary embodiment of the present invention, the schedule of orders may depend not on a single price but on two prices commonly referred to as the "bid price" and the "ask price." Where the bid price is not equal to the ask price, as is usually the case, the brokerage cannot usually provide every investor with the mid-price.

Rather, where orders to buy are greater than orders to sell, or vice versa, the brokerage must usually equitably allocate prices among customers.

One exemplary embodiment of an equitable allocation method, in which orders to buy are greater than orders to sell, provides that the sellers all receive the mid-price, but the buyers receive a weighted average of the mid-price and the ask price. Conversely, where orders to sell are greater than orders to buy, the exemplary embodiment provides that the buyers all receive the mid-price, but the sellers receive a weighted average of the mid-price and the bid price.

Determining the number of shares to order for different levels of bid-ask spread pricing requires the solution of a quadratic equation, but ultimately generates a simple schedule of the number of shares to buy or sell as the bid and ask price fluctuate.

This exemplary embodiment of the present invention provides a method and apparatus for aggregating, netting and executing securities trades on behalf of investors some of whom express their orders in share amounts and some of whom express their orders in dollar amounts, where prices are expressed as a bid price and an ask price and the brokerage wishes to: (1) minimize its risk; and (2) provide investors with the same price regardless whether an investor expressed an order in terms of dollars or shares (that is, although the price provided to buyers and sellers may differ, the price provided to the class of buyers or the class of sellers will not vary based on how the buyers or sellers expressed their order).

Under this exemplary embodiment, the brokerage captures the spread between the bid and the ask price and passes the benefits of capturing that spread on to its customers, as follows: (1) in the case of an overall buy order, (a) the sellers all receive the mid-price (defined as the price mid-way between the bid price and the ask price) and (b) the buyers all pay a price that is a weighted average of the mid-price and the ask price; and (2) in the case of an overall sell order, (a) the sellers all receive a price that is a weighted average of the mid-price and the bid price and (b) the buyers all receive the mid price.

Schedule of Orders—Bid Price and Ask Price Implementation

Under this aspect of the invention, the number of shares to be purchased S* (in the case of an overall buy order) is calculated with the following equations:

$$S^* = (N_s^b - N_s^s) + \frac{N_\$^b}{P^*} - \frac{N_\$^s}{P_m}$$

and $$P^* = \left[\frac{S^*}{\frac{N_\$^b}{P^*} + N_s^b}\right] P_a + \left[\frac{\frac{N_\$^b}{P^*} + N_s^b - S^*}{\frac{N_\$^b}{P^*} + N_s^b}\right] P_m$$

This second equation can be expressed as the following quadratic equation:

$$\alpha P^{*2} + \beta P^* + \gamma = 0$$

where $$\alpha = N_s^b,$$

$$\beta = N_\$^b - N_s^s P_m - N_\$^s - P_a\left(N_s^b - N_s^s - \frac{N_\$^s}{P_m}\right), \text{ and}$$

$$\gamma = -P_a N_\$^b.$$

Solving for P* yields:

$$P^* = \begin{cases} \frac{-\beta \pm \sqrt{\beta^2 - 4\alpha\gamma}}{2\alpha} & \text{if } \alpha \neq 0 \\ \frac{\gamma}{\beta} & \text{if } \alpha = 0 \end{cases}.$$

Similarly, the number of shares to be sold (in the case of an overall sell order) is calculated with the following equations:

$$S^* = (N_s^b - N_s^s) + \frac{N_\$^b}{P_m} - \frac{N_\$^s}{P^*}$$

and $$P^* = \left[\frac{S^*}{\frac{N_\$^s}{P^*} + N_s^s}\right] P_b + \left[\frac{\frac{N_\$^s}{P^*} + N_s^s - S^*}{\frac{N_\$^s}{P^*} + N_s^s}\right] P_m$$

This second equation can also expressed as the following quadratic equation:

$$\alpha P^{*2} + \beta P^* + \gamma = 0$$

where $$\alpha = -N_s^s,$$

$$\beta = -N_\$^s + N_s^b P_m + N_\$^b - P_b\left(-N_s^s + N_s^b + \frac{N_\$^b}{P_m}\right), \text{ and}$$

$$\gamma = P_b N_\$^s.$$

Solving for P yields:

$$P^* = \begin{cases} \frac{-\beta \pm \sqrt{\beta^2 - 4\alpha\gamma}}{2\alpha} & \text{if } \alpha \neq 0 \\ \frac{\gamma}{\beta} & \text{if } \alpha = 0 \end{cases}.$$

For example, assume that the brokerage receives orders from investors to buy and sell security Y, which aggregate to an order to buy 2000 shares, an aggregate order to buy $20,000 worth of shares, an aggregate order to sell 100 shares, and an aggregate order to sell $10,000 worth of shares. This order nets to an order to buy 1900 shares and $10,000 worth of shares. Assume further that the bid and ask prices are $P_b$=90, $P_a$=90.0625; yielding a mid-price of $P_m$=90.03125. Using the formulas above,

α=2000, β=−116,118.40, γ=−1,801,250,

P*=90.059532 and

S*=2012 (rounded up to the nearest share).

Repeating this process for different levels of the bid and ask price yields the following schedule for transmission by the brokerage to the market maker.

| Bid | Ask | Schedule |
|---|---|---|
| 89.1875 | 89.25 | 2013 |
| 89.25 | 89.3125 | 2012 |
| 89.3125 | 89.375 | 2012 |
| 89.375 | 89.4375 | 2012 |
| 89.4375 | 89.5 | 2012 |
| 89.5 | 89.5625 | 2012 |
| 89.5625 | 89.625 | 2012 |
| 89.625 | 89.6875 | 2012 |
| 89.6875 | 89.75 | 2012 |
| 89.75 | 89.8125 | 2012 |
| 89.8125 | 89.875 | 2012 |
| 89.875 | 89.9375 | 2012 |
| 89.9375 | 90 | 2012 |
| 90 | 90.0625 | 2012 |

Although this schedule shows a constant spread between the bid and ask price, the present invention applies equally to situations in which the spread changes. Thus, for any spread between the bid price and the ask price, the above calculation will provide the maximum number of shares to be purchased by the market maker on behalf of the brokerage to ensure minimal excess, and consequently minimal inefficiency and cost associated with the trade.

Schedule of Orders—Insufficient Shares in Dollar-Based Sell Orders

The schedule of orders can be generated in a way that allows for the possibility that changes in securities prices might result in situations in which customers who have placed dollar-based orders to sell might have insufficient shares to generate the money the customer hoped to raise through a sale. In addition, the above method can be modified to address situations in which investors who place sell orders in terms of dollar amounts do not have enough shares to fulfill the dollar amount of their sell orders due to a drop in the price of the shares from the time the investors placed the order and the time the brokerage executes it.

Specifically, if the brokerage's customers do not have enough shares to sell to realize the dollar amount of their sell orders, the dollar amount of sell orders is replaced with a new dollar amount equal to the estimated price P* or $P_m$ multiplied by the number of shares that such customers do have to sell. This new estimated dollar amount can be used to recalculate the prices P* and $P_m$. If a particular customer does not have sufficient shares to sell to raise the dollar amount indicated in the customer's dollar-based sell order, the order can be returned to the customer as unexecuted or, alternatively, the order can be executed at the current price for all of the shares of the security in question. In the latter case, the customer would receive an indication that the dollar-based sell order could not be executed at the parameters set by the user and market parameters were substituted.

If the problem persists, the procedure is repeated until reaching convergence. It should take only a few iterations to reach convergence to a dollar sell order for which the investors have a sufficient number of shares.

Apparatus for Determining Schedule of Orders and Performing Aggregation and Netting of Mixed Orders One possible implementation of an apparatus for determining the schedule of orders includes a central processor coupled to a computer network, such as the Internet, that receives customer orders electronically, aggregates and nets the orders, calculates the schedule of orders and transmits the schedule to the market maker over a computer network, such as the Internet. In this exemplary embodiment, customers execute a portfolio manager program on their personal computers and are linked to the central processor via direct dial-up modem, local area network connection or other computer network, such as the Internet.

Apparatus for Calculating Buy Order by Market Maker

According to one possible implementation of the above method, an apparatus for calculating the schedule of prices includes a hand-held computer, such as a palm pilot, programmed to perform the schedule of prices calculation set forth above. The brokerage provides the market maker with this hand-held computer, and transmits the information about its customers' orders and into the hand-held computer, either by Internet link or otherwise. The market maker feeds information about current prices. The hand-held computer then calculates the amount of shares the market maker should buy at current prices in accordance with one of the above methods.

It should be noted that the above method for aggregating and netting a collection of trading orders to trade instruments, such as securities, some of which are expressed in dollar amounts and some of which are expressed in share amounts, is applicable to many types of brokerages, including, but not limited to a 401(k) plan that is administered by the brokerage, a trust, an Individual Retirement Account, a Keogh Plan, a Pension Plan, a Qualified Plan, or any other account holding tradable assets or liabilities.

What is claimed is:

1. A method for processing a plurality of orders for at least one instrument comprising:

combining a value-based trading order for at least one instrument with a share-based trading order for the at least one instrument to create a final trading order for the at least one instrument; and converting the final trading order into a series of contingent orders for the at least one instrument specifying a number of shares of the at least one instrument to be traded at a schedule of prices, further comprising calculating the number of shares of the at least one instrument in the schedule of prices according to the following equations:

for a buy order:

$$S^* = (N_s^b - N_s^s) + \frac{N_\$^b}{P^*} - \frac{N_\$^s}{P_m}$$

$$P^* = \begin{cases} \frac{-\beta \pm \sqrt{\beta^2 - 4\alpha\gamma}}{2\alpha} & \text{if } \alpha \neq 0 \\ \frac{\gamma}{\beta} & \text{if } \alpha = 0 \end{cases}$$

wherein:

$$\alpha = N_s^b,$$

$$\beta = N_\$^b - N_\$^s P_m - N_\$^s - P_a\left(N_s^b - N_s^s - \frac{N_\$^s}{P_m}\right), \text{ and}$$

$$\gamma = -P_a N_\$^b;$$

for a sell order:

$$S^* = (N_s^b - N_s^s) + \frac{N_\$^b}{P_m} - \frac{N_\$^s}{P^*}$$

$$P^* = \begin{cases} \frac{-\beta \pm \sqrt{\beta^2 - 4\alpha\gamma}}{2\alpha} & \text{if } \alpha \neq 0 \\ \frac{\gamma}{\beta} & \text{if } \alpha = 0 \end{cases} \text{ where}$$

$$\alpha = -N_s^s,$$

$$\beta = -N_\$^s + N_s^b P_m + N_\$^b - P_b\left(-N_s^s + N_s^b + \frac{N_\$^b}{P_m}\right), \text{ and}$$

$$\gamma = P_b N_\$^s;$$

wherein:
S*=the number of shares of the at least one instrument to be bought or, if negative, sold at a particular price P*;
$N_s^b$=a number of shares of the at least one instrument to be bought in the plurality of share-based trading orders;
$N_s^s$=a number of shares of the at least one instrument to be sold in the plurality of share-based trading orders;
$N_\$^b$=a dollar amount of the at least one instrument to be bought in the plurality of dollar-based trading orders; and
$N_\$^s$=a dollar amount of the at least one instrument to be sold in the plurality of dollar-based trading orders.

2. A computer readable medium storing instructions that, when executed by a processor, cause the processor to:
combine a value-based trading order for at least one instrument with a share-based trading order for the at least one instrument to create a final trading order for the at least one instrument; and
convert the final trading order into a series of contingent orders for the at least one instrument specifying a number of shares of the at least one instrument to be traded at a schedule of prices,
the instructions further causing the processor to calculate the number of shares of the at least one instrument in the schedule of prices according to the following equations:
for a buy order:

$$S^* = (N_s^b - N_s^s) + \frac{N_\$^b}{P^*} - \frac{N_\$^s}{P_m}$$

$$P^* = \begin{cases} \frac{-\beta \pm \sqrt{\beta^2 - 4\alpha\gamma}}{2\alpha} & \text{if } \alpha \neq 0 \\ \frac{\gamma}{\beta} & \text{if } \alpha = 0 \end{cases}$$

wherein:

$$\alpha = N_s^b,$$

$$\beta = N_\$^b - N_s^s P_m - N_\$^s - P_a\left(N_s^b - N_s^s - \frac{N_\$^s}{P_m}\right), \text{ and}$$

$$\gamma = -P_a N_\$^b;$$

for a sell order:

$$S^* = (N_s^b - N_s^s) + \frac{N_\$^b}{P_m} - \frac{N_\$^s}{P^*}$$

-continued $$P^* = \begin{cases} \frac{-\beta \pm \sqrt{\beta^2 - 4\alpha\gamma}}{2\alpha} & \text{if } \alpha \neq 0 \\ \frac{\gamma}{\beta} & \text{if } \alpha = 0 \end{cases} \text{ where}$$

$$\alpha = -N_s^s,$$

$$\beta = -N_\$^s + N_s^b P_m + N_\$^b - P_b\left(-N_s^s + N_s^b + \frac{N_\$^b}{P_m}\right), \text{ and}$$

$$\gamma = P_b N_\$^s;$$

wherein:
S*=the number of shares of the at least one instrument to be bought or, if negative, sold at a particular price P*;
$N_s^b$=a number of shares of the at least one instrument to be bought in the plurality of share-based trading orders;
$N_s^s$=a number of shares of the at least one instrument to be sold in the plurality of share-based trading orders;
$N_s^b$=a dollar amount of the at least one instrument to be bought in the plurality of dollar-based trading orders; and
$N_s^s$=a dollar amount of the at least one instrument to be sold in the plurality of dollar-based trading orders.

3. A method for processing a plurality of orders for at least one instrument comprising:
netting a plurality of value-based trading orders for at least one instrument against each other to create a net value-based trading order for the at least one instrument;
netting a plurality of share-based trading orders for the at least one instrument against each other to create a net share-based trading order for the at least one instrument; and
converting the net value-based trading order for the at least one instrument and the net share-based trading order for the at least one instrument into a series of contingent orders for the at least one instrument specifying a number of shares of the at least one instrument to be traded at a schedule of prices,
further comprising calculating the number of shares of the at least one instrument in the schedule of prices according to the following equations:
(1) for a buy order:

$$S^* = (N_s^b - N_s^s) + \frac{N_\$^b}{P^*} - \frac{N_\$^s}{P_m}$$

$$P^* \begin{cases} \frac{-\beta \pm \sqrt{\beta^2 - 4\alpha\gamma}}{2\alpha} & \text{if } \alpha \neq 0 \\ \frac{\gamma}{\beta} & \text{if } \alpha = 0 \end{cases}$$

wherein:

$$\alpha = N_s^b,$$

$$\beta = N_\$^b - N_s^s P_m - N_\$^s - P_a\left(N_s^b - N_s^s - \frac{N_\$^s}{P_m}\right), \text{ and}$$

$$\gamma = -P_a N_\$^b;$$

(2) for a sell order:

$$S^* = (N_s^b - N_s^s) + \frac{N_\$^b}{P_m} - \frac{N_\$^s}{P^*}$$

$$P^* = \begin{cases} \frac{-\beta \pm \sqrt{\beta^2 - 4\alpha\gamma}}{2\alpha} & \text{if } \alpha \neq 0 \\ \frac{\gamma}{\beta} & \text{if } \alpha = 0 \end{cases} \text{ where}$$

$$\alpha = -N_s^s,$$

$$\beta = -N_\$^s + N_s^b P_m + N_\$^b - P_b\left(-N_s^s + N_s^b + \frac{N_\$^b}{P_m}\right), \text{ and}$$

$$\gamma = P_b N_\$^s;$$

wherein:

S*=the number of shares of the at least one instrument to be bought or, if negative, sold at a particular price P*;
  $N_s^b$=a number of shares of the at least one instrument to be bought in the plurality of share-based trading orders;
  $N_s^s$=a number of shares of the at least one instrument to be sold in the plurality of share-based trading orders;
  $N_\$^b$=a dollar amount of the at least one instrument to be bought in the plurality of dollar-based trading orders; and
  $N_\$^s$=a dollar amount of the at least one instrument to be sold in the plurality of dollar-based trading orders.

4. An apparatus for executing trades in at least one instrument comprising:
  a processor coupled to a memory containing instructions that when executed by the processor cause the processor to receive a plurality of trading orders, including a plurality of value-based trading orders and a plurality of share-based trading orders;
  net a plurality of value-based trading orders for at least one instrument against each other to create a net value-based trading order for the at least one instrument;
  net a plurality of share-based trading orders for the at least one instrument against each other to create a net share-based trading order for the at least one instrument; and
  convert the net value-based trading order for the at least one instrument and the net share-based trading order for the at least one instrument into a series of contingent orders for the at least one instrument specifying a number of shares of the at least one instrument to be traded at a schedule of prices; and
  transmit the series of contingent orders for the at least one instrument to a third party market maker for execution,
  wherein the instructions further cause the processor to calculate the number of shares of the at least one instrument in the schedule of prices according to the following equations:
  (1) for a buy order:

$$S^* = (N_s^b - N_s^s) + \frac{N_\$^b}{P^*} - \frac{N_\$^s}{P_m}$$

-continued $$P^* = \begin{cases} \frac{-\beta \pm \sqrt{\beta^2 - 4\alpha\gamma}}{2\alpha} & \text{if } \alpha \neq 0 \\ \frac{\gamma}{\beta} & \text{if } \alpha = 0 \end{cases}$$

wherein:

$\alpha = N_s^b,$ $\beta = N_\$^b - N_s^s P_m - N_\$^s - P_a\left(N_s^b - N_s^s - \frac{N_\$^s}{P_m}\right), \text{ and}$ $\gamma = -P_a N_\$^b;$ (2) for a sell order:

$$S^* = (N_s^b - N_s^s) + \frac{N_\$^b}{P_m} - \frac{N_\$^s}{P^*}$$

$$P^* = \begin{cases} \frac{-\beta \pm \sqrt{\beta^2 - 4\alpha\gamma}}{2\alpha} & \text{if } \alpha \neq 0 \\ \frac{\gamma}{\beta} & \text{if } \alpha = 0 \end{cases} \text{ where}$$

$$\alpha = -N_s^s,$$

$$\beta = -N_\$^s + N_s^b P_m + N_\$^b - P_b\left(-N_s^s + N_s^b + \frac{N_\$^b}{P_m}\right), \text{ and}$$

$$\gamma = P_b N_\$^s;$$

wherein:
  S*=the number of shares of the at least one instrument to be bought or, if negative, sold at a particular price P*;
  $N_s^b$=a number of shares of the at least one instrument to be bought in the plurality of share-based trading orders;
  $N_s^s$=a number of shares of the at least one instrument to be sold in the plurality of share-based trading orders;
  $N_\$^b$=a dollar amount of the at least one instrument to be bought in the plurality of dollar-based trading orders; and
  $N_\$^s$=a dollar amount of the at least one instrument to be sold in the plurality of dollar-based trading orders.

5. A method for trading a plurality of orders for at least one instrument comprising the steps of:
  receiving a plurality of value-based orders for the at least one instrument from a first plurality of investors;
  receiving a plurality of share-based orders for the at least one instrument from a second plurality of investors; and
  executing one of a plurality of contingent orders in the at least one instrument, further comprising the steps of:
  aggregating all share-based buy orders for the at least one instrument into a single share-based buy order for the at least one instrument; and
  aggregating all share-based sell orders for the at least one instrument into a single share-based sell order for the at least one instrument, further comprising the step of:
  netting the single share-based buy order for the at least one instrument against the single share-based sell order for at least one instrument to form a single share-based trading order for the at least one instrument,
  further comprising the step of calculating the number of shares of the at least one instrument in the schedule of prices according to the following equations:

(1) for a buy order:

$$S^* = (N_s^b - N_s^s) + \frac{N_\$^b}{P^*} - \frac{N_\$^s}{P_m}$$

$$P^* = \begin{cases} \frac{-\beta \pm \sqrt{\beta^2 - 4\alpha\gamma}}{2\alpha} & \text{if } \alpha \neq 0 \\ \frac{\gamma}{\beta} & \text{if } \alpha = 0 \end{cases}$$

wherein:

$\alpha = N_s^b$, $\beta = N_\$^b - N_s^s P_m - N_\$^s - P_a\left(N_s^b - N_s^s - \frac{N_\$^s}{P_m}\right)$, and $\gamma = -P_a N_\$^b$;

(2) for a sell order:

$$S^* = (N_s^b - N_s^s) + \frac{N_\$^b}{P_m} - \frac{N_\$^s}{P^*}$$

$$P^* = \begin{cases} \frac{-\beta \pm \sqrt{\beta^2 - 4\alpha\gamma}}{2\alpha} & \text{if } \alpha \neq 0 \\ \frac{\gamma}{\beta} & \text{if } \alpha = 0 \end{cases} \text{ where}$$

$\alpha = -N_s^s$, $\beta = -N_\$^s + N_s^b P_m + N_\$^b - P_b\left(-N_s^s + N_s^b + \frac{N_\$^b}{P_m}\right)$, and $\gamma = P_b N_\$^s$;

wherein:
- $S^*$=the number of shares of the at least one instrument to be bought or, if negative, sold at a particular price $P^*$;
- $N_s^b$=a number of shares of the at least one instrument to be bought in the plurality of share-based trading orders;
- $N_s^s$=a number of shares of the at least one instrument to be sold in the plurality of share-based trading orders;
- $N_S^b$=a dollar amount of the at least one instrument to be bought in the plurality of dollar-based trading orders; and
- $N_S^s$=a dollar amount of the at least one instrument to be sold in the plurality of dollar-based trading orders.

6. An apparatus for executing trades in at least one instrument comprising:
- a central controller for coupling to a communications network via which are received by the central controller a plurality of trading orders, including a plurality of value-based trading orders and a plurality of share-based trading orders, said central controller;
- aggregating and netting a plurality of value-based trading orders for at least one instrument against each other to create a single value-based trading order for the at least one instrument;
- aggregating and netting a plurality of share-based trading orders for the at least one instrument against each other to create a single share-based trading order for the at least one instrument; and
- converting the single value-based trading order for the at least one instrument and the single share-based trading order for the at least one instrument into a series of contingent orders for the at least one instrument specifying a number of shares of the at least one instrument to be traded at a schedule of prices; and
- a database storing the plurality of value-based orders and the plurality of share-based orders and the series of contingent orders, wherein said central controller transmits the series of contingent orders for the at least one instrument to a third party market maker for execution, wherein the central controller calculates the number of shares of the at least one instrument in the schedule of prices according to the following equations:

(1) for a buy order:

$$S^* = (N_s^b - N_s^s) + \frac{N_\$^b}{P^*} - \frac{N_\$^s}{P_m}$$

$$P^* = \begin{cases} \frac{-\beta \pm \sqrt{\beta^2 - 4\alpha\gamma}}{2\alpha} & \text{if } \alpha \neq 0 \\ \frac{\gamma}{\beta} & \text{if } \alpha = 0 \end{cases}$$

wherein:

$\alpha = N_s^b$, $\beta = N_\$^b - N_s^s P_m - N_\$^s - P_a\left(N_s^b - N_s^s - \frac{N_\$^s}{P_m}\right)$, and $\gamma = -P_a N_\$^b$;

(2) for a sell order:

$$S^* = (N_s^b - N_s^s) + \frac{N_\$^b}{P_m} - \frac{N_\$^s}{P^*}$$

$$P^* = \begin{cases} \frac{-'\beta \pm \sqrt{\beta^2 - 4\alpha\gamma}}{2\alpha} & \text{if } \alpha \neq 0 \\ \frac{\gamma}{\beta} & \text{if } \alpha = 0 \end{cases} \text{ where}$$

$\alpha = -N_s^s$, $\beta = -N_\$^s + N_s^b P_m + N_\$^b - P_b\left(-N_s^s + N_s^b + \frac{N_\$^b}{P_m}\right)$, and $\gamma = P_b N_\$^s$;

wherein:
- $S^*$=the number of shares of the at least one instrument to be bought or, if negative, sold at a particular price $P^*$;
- $N_s^b$=a number of shares of the at least one instrument to be bought in the plurality of share-based trading orders;
- $N_s^s$=a number of shares of the at least one instrument to be sold in the plurality of share-based trading orders;
- $N_S^b$=a dollar amount of the at least one instrument to be bought in the plurality of dollar-based trading orders; and
- $N_S^s$=a dollar amount of the at least one instrument to be sold in the plurality of dollar-based trading orders.

* * * * *

UNITED STATES PATENT AND TRADEMARK OFFICE
CERTIFICATE OF CORRECTION

| | | |
|---|---|---|
| PATENT NO. | : 7,047,218 B1 | Page 1 of 1 |
| APPLICATION NO. | : 09/516792 | |
| DATED | : May 16, 2006 | |
| INVENTOR(S) | : Steven M. H. Wallman et al. | |

It is certified that error appears in the above-identified patent and that said Letters Patent is hereby corrected as shown below:

On the Title Page

Item "(75) Inventor: Steven M. H. Wallman, Great Falls, VA (US)" should read --(75) Inventors: Steven M. H. Wallman, Great Falls, VA (US);

Ludwig B. Chincarini, Claremont, CA (US)--.

Signed and Sealed this

Eighth Day of March, 2011

David J. Kappos
*Director of the United States Patent and Trademark Office*